United States Patent [19]

Itoh

[11] Patent Number: 5,794,158
[45] Date of Patent: Aug. 11, 1998

[54] PORTABLE RADIO APPARATUS

[75] Inventor: Ryoh Itoh, Tokyo, Japan

[73] Assignee: NEC Corporation, Tokyo, Japan

[21] Appl. No.: 581,996

[22] Filed: Jan. 2, 1996

[30] Foreign Application Priority Data

Jan. 12, 1995 [JP] Japan ................... 7-003190

[51] Int. Cl.$^6$ .................. H04B 1/38; H01Q 1/24
[52] U.S. Cl. ................ 455/550; 455/575; 343/702
[58] Field of Search .................. 455/89, 90, 129, 455/550, 552, 553, 575, 83, 121; 343/702, 745, 900

[56] References Cited

U.S. PATENT DOCUMENTS

| | | | |
|---|---|---|---|
| 4,521,913 | 6/1985 | Huber et al. | 455/129 |
| 5,144,324 | 9/1992 | Chin et al. | 343/702 |
| 5,204,687 | 4/1993 | Elliott et al. | |
| 5,374,937 | 12/1994 | Tsunekawa et al. | |
| 5,548,827 | 8/1996 | Hanawa et al. | 455/129 |

FOREIGN PATENT DOCUMENTS

| | | |
|---|---|---|
| 0 613 206 | 8/1994 | European Pat. Off. |
| 0 617 520 | 9/1994 | European Pat. Off. |
| 63-92440 | 6/1988 | Japan . |
| 5-167323 | 7/1993 | Japan . |

*Primary Examiner*—Reinhard J. Eisenzopf
*Assistant Examiner*—Lester G. Kincaid
*Attorney, Agent, or Firm*—Young & Thompson

[57] ABSTRACT

A portable radio apparatus includes an antenna, a transmission/reception circuit, a first matching circuit, a second matching circuit, and a first switch. The antenna consists of a linear element portion constituting a whip antenna and a helical coil portion constituting a helical antenna fixed to a distal end of the linear element portion through an insulating portion. The antenna is supported to be extendible from a housing. The transmission/reception circuit is connected to the helical coil portion in an antenna accommodation state and connected to the linear element portion in an antenna extension state. The first matching circuit performs impedance matching between the helical coil portion and the transmission/reception circuit. The second matching circuit performs impedance matching between the linear element portion and the transmission/reception circuit. The first switch connects the helical coil portion to the first matching circuit in the antenna accommodation state and connects the linear element portion to the second matching circuit in the antenna extension state.

10 Claims, 3 Drawing Sheets

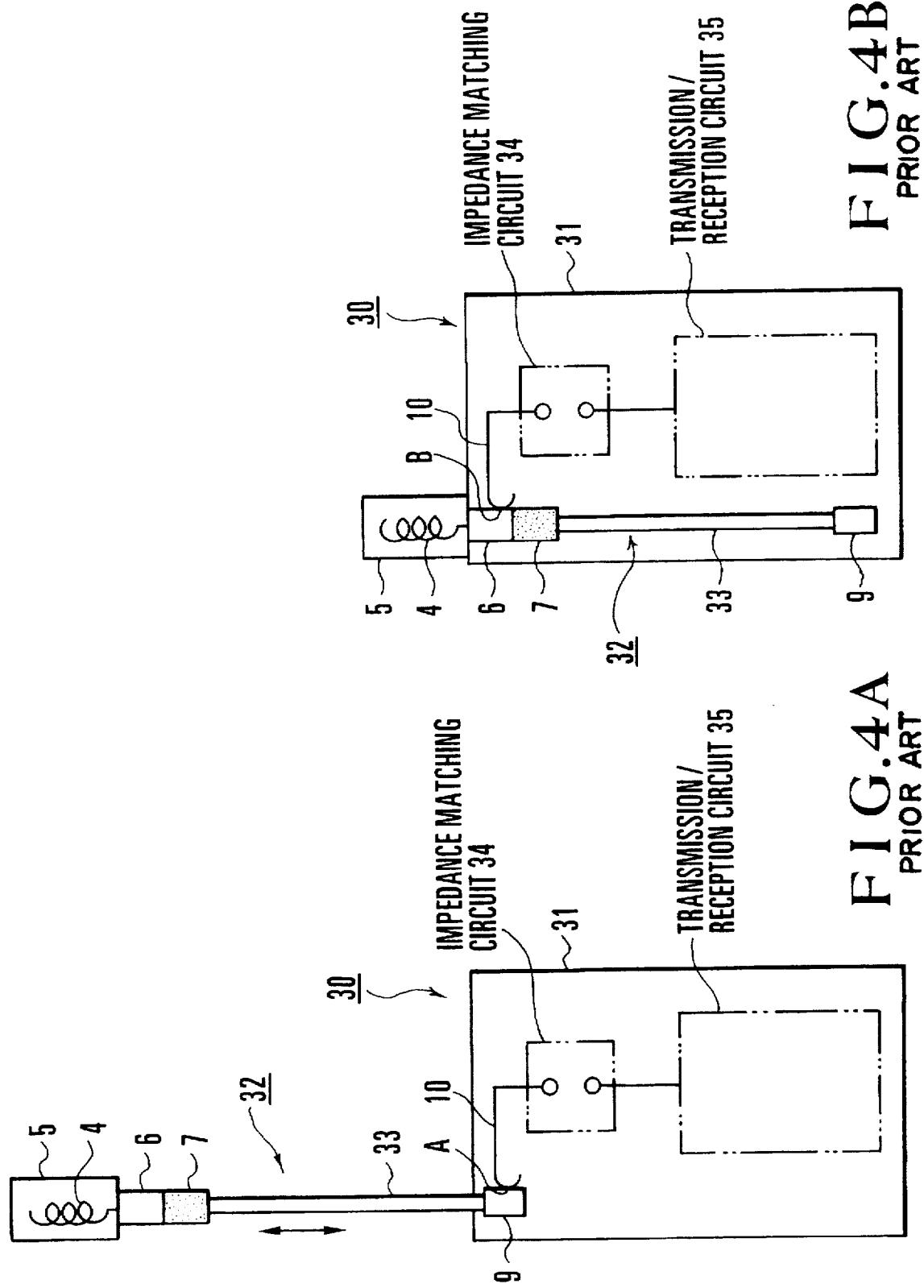

PORTABLE RADIO APPARATUS

BACKGROUND OF THE INVENTION

The present invention relates to a portable radio apparatus such as a portable telephone with an antenna which can be accommodated/extended in/from a housing.

In a portable radio apparatus of this type, an antenna is accommodated in the housing of the portable radio apparatus in a call terminating wait state while only the helical coil portion at the distal end is exposed from the housing. In a call originating or busy state, the antenna is extended from the housing, and the linear element portion is also extended from the housing.

FIGS. 4A and 4B schematically show the arrangement of a portable radio apparatus described in U.S. Pat. No. 5,204, 687. A portable radio apparatus 30 has a whip antenna 32 supported to be extendible from a housing 31.

The whip antenna 32 is constituted by a linear element portion 33 having an electrical length of $\lambda/4$ ($\lambda$: wavelength of a radio wave), and a helical coil portion 4 integrally attached to the distal end of the linear element portion 33 through an insulating portion 7, covered with a protection cover 5 consisting of a synthetic resin, and having an electrical length of $\lambda/4$. A helical coil feeder portion 6 consisting of a conductive member is interposed between the helical coil portion 4 and the insulating portion 7 to supply power to the helical coil portion 4. A linear element feeder portion 9 consisting of a conductive member is attached to the lower end of the linear element portion 33 to supply power to the linear element portion 33. Reference numeral 10 denotes a feeder fitment in contact with the feeder portions 6 and 9; and 34, an impedance matching circuit for an electrical length of $\lambda/4$, which is interposed between the feeder fitment 10 and a transmission/reception circuit.

With this arrangement, in a call terminating wait state, the whip antenna 32 is accommodated in the housing 31, as shown in FIG. 4B, thereby exposing only the helical coil portion 4 from the housing 31 and accommodating the linear element portion 33 in the housing 31. At this time, the helical coil feeder portion 6 is brought into contact with the feeder fitment 10 so that power is supplied from a transmission/ reception circuit 35 to the helical coil portion 4 through a feeding point B. In a call originating or busy state, the whip antenna 32 is extended from the housing 31, thereby extending the linear element portion 33 from the housing 31, as shown in FIG. 4A. At this time, the linear element feeder portion 9 is brought into contact with the feeder fitment 10 so that power is supplied from the transmission/reception circuit 35 to the linear element portion 33 through a feeding point A.

In the above-described conventional portable radio apparatus, however, when the linear element portion 33 is extended from the housing 31 in the call originating or busy state, the current is maximized at the feeding point A formed between the power supply metal piece 10 and the linear element feeder portion 9, as is apparent from the current distribution, since the linear element portion 33 has an electrical length of $\lambda/4$. For this reason, a relatively large current flows through the housing 31, and the current is discharged through the human body in contact with the housing 31 in the call originating or busy state, resulting in a large degradation in speaking characteristics.

Japanese Utility Model Laid-Open No. 63-92440 discloses a portable radio apparatus in which the impedance matching circuit is switched between a predetermined length accommodation state and an extension state of the whip antenna. However, since the whip antenna cannot be completely accommodated in a call terminating wait state, this portable radio apparatus has an inconvenience in portability. In addition, high-frequency coupling between the elements and other metal parts in the case in the predetermined length accommodation state of the antenna causes a loss.

SUMMARY OF THE INVENTION

It is an object of the present invention to provide a portable radio apparatus capable of obtaining excellent speaking characteristics.

It is another object of the present invention to provide a convenient portable radio apparatus free from loss.

In order to achieve the above objects, according to the present invention, there is provided a portable radio apparatus comprising an antenna consisting of a linear element portion constituting a whip antenna and a helical coil portion constituting a helical antenna fixed to a distal end of the linear element portion through an insulating portion, the antenna being supported to be extendible from a housing, transmission/reception means connected to the helical coil portion in an antenna accommodation state and connected to the linear element portion in an antenna extension state, first matching means for performing impedance matching between the helical coil portion and the transmission/ reception means, second matching means for performing impedance matching between the linear element portion and the transmission/reception means, and first switching means for connecting the helical coil portion to the first matching means in the antenna accommodation state and connecting the linear element portion to the second matching means in the antenna extension state.

BRIEF DESCRIPTION OF THE DRAWINGS

FIGS. 4A and 4B are schematic diagrams showing the arrangement of a conventional portable radio apparatus in a busy state and in a call terminating wait state, respectively.

DESCRIPTION OF THE PREFERRED EMBODIMENT

Figure 1:
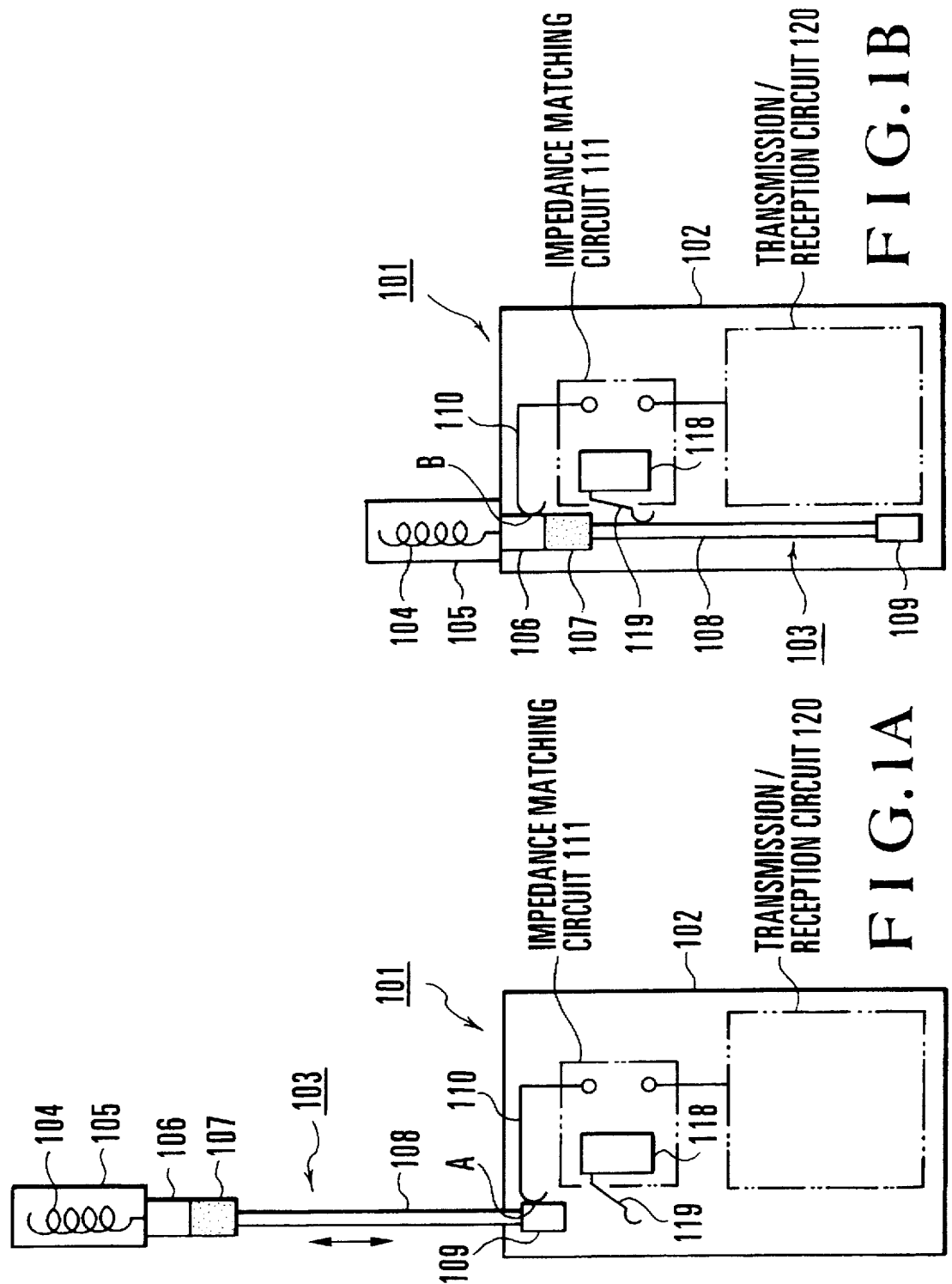
FIGS. 1A and 1B are schematic diagrams showing the arrangement of a portable radio apparatus according to an embodiment of the present invention in a busy state and in a call terminating wait state, respectively.

The embodiment of the present invention will be described below with reference to the accompanying drawings. FIGS. 1A and 1B schematically show the arrangement of a portable radio apparatus according to an embodiment of the present invention in a busy state and in a call terminating wait state, respectively. A portable radio apparatus 101 has an antenna 103 to be extendible from a housing 102. The antenna 103 is constituted by a linear element portion 108 having an electrical length of $\lambda/4$, and a helical coil portion 104 integrally attached to the distal end of the linear element portion 108 through an insulating portion 107, covered with a protection cover 105 consisting of a synthetic resin, and having an electrical length of $\lambda/2$. The linear element portion 108 constitutes a whip antenna while the helical coil portion 104 constitutes a helical antenna. Both the antennas can perform transmission/reception.

A helical coil feeder portion 106 consisting of a conductive member is interposed between the helical coil portion 104 and the insulating portion 107 to supply power to the helical coil portion 104. A linear element feeder portion 109 consisting of a conductive member is attached to the lower end of the linear element portion 108 to reciprocally move in the housing 102 and supply power to the linear element portion 108. A feeder fitment 110 is arranged in the housing 102 and selectively brought into contact with the helical coil feeder portion 106 and the linear element feeder portion 109.

Figures 2, 3:
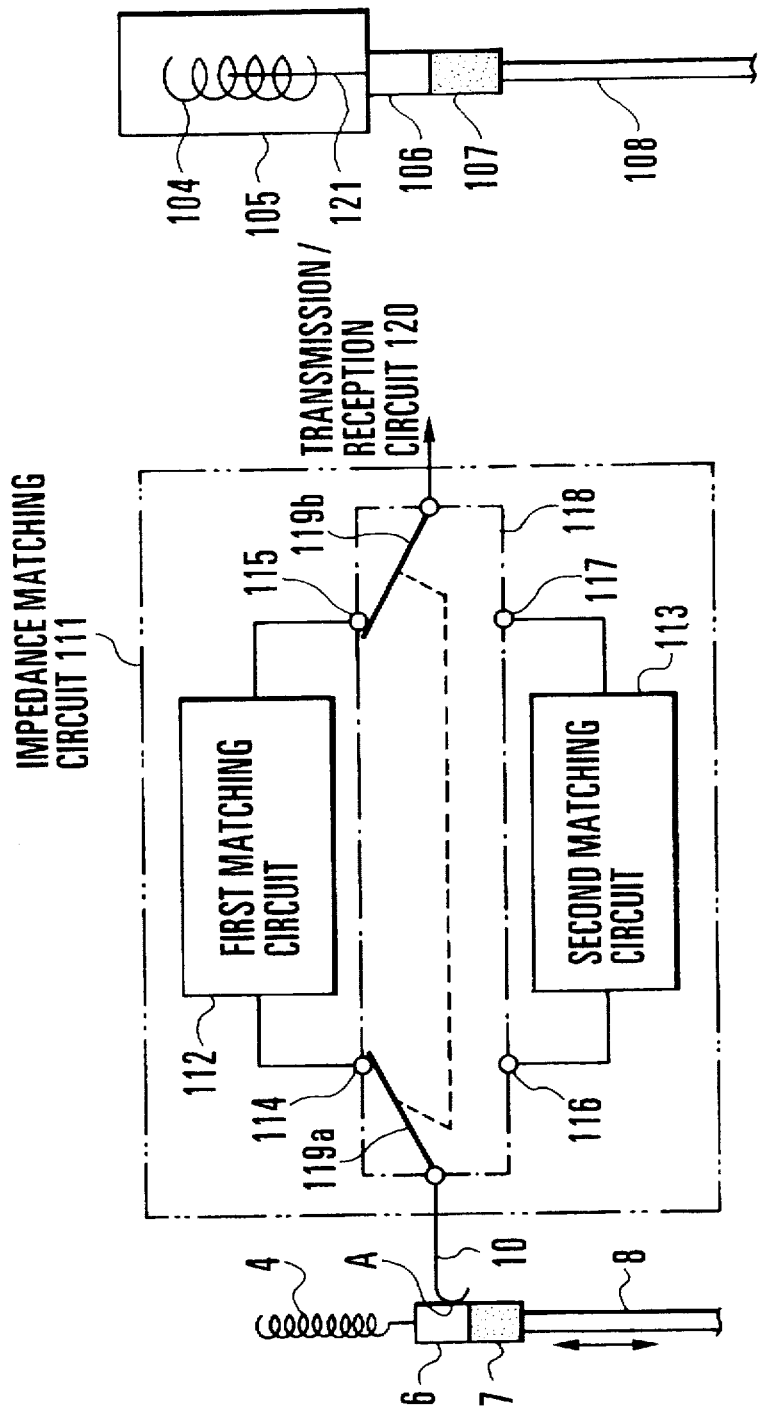
FIG. 2 is a diagram showing the arrangement of an impedance matching circuit shown in FIGS. 1A and 1B.
FIG. 3 is an enlarged view showing another structure of a helical coil portion shown in FIGS. 1A and 1B.

A transmission/reception circuit 120 and an impedance matching circuit 111 connected between the feeder fitment 110 and the transmission/reception circuit 120 are arranged in the housing 102. As shown in FIG. 2, the impedance matching circuit 111 has a first matching circuit 112 matching the electrical length of λ/4 in an accommodation state, a second matching circuit 113 matching the electrical length of λ/2 in an extension state, and a change-over switch 118 for switching the first and second matching circuits 112 and 113. An actuator 119 of the change-over switch 118 is operated by the linear element portion 108 accommodated in the housing 102. In accordance with the operation of the actuator 119, a pair of contacts 119a and 119b are selectively brought into contact with terminal portions 114 and 115 or terminal portions 116 and 117 of the first and second matching circuits 112 and 113, respectively, so that one of the first and second matching circuits 112 and 113 is selected.

The operation of the portable radio apparatus with the above arrangement will be described below. In a call terminating wait state, the linear element portion 108 is accommodated in the housing 102, and only the helical coil portion 104 having an electrical length of λ/4 projects from the housing 102, as shown in FIG. 1B. In this state, the helical coil feeder portion 106 is brought into contact with the feeder fitment 110 to supply power from the transmission/reception circuit 120 to the helical coil portion 104 through the impedance matching circuit 111, the feeder fitment 110, a feeding point B, and the helical coil feeder portion 106. At this time, the linear element portion 108 operates the actuator 119 to bring the contacts 119a and 119b into contact with the terminal portions 114 and 115, respectively, thereby selecting the first matching circuit 112 matching the electrical length of λ/4 in the accommodation state.

In a call originating or busy state, the linear element portion 108 having an electrical length of λ/2 is extended from the housing 102, as shown in FIG. 1A. The linear element feeder portion 109 is brought into contact with the feeder fitment 110 to supply power from the transmission/reception circuit 120 to the linear element portion 108 through the impedance matching circuit 111, the feeder fitment 110, a feeding point A, and the linear element feeder portion 109. At this time, the operation of the actuator 119 of the linear element portion 108 by the linear element portion 108 is canceled to switch the contacts 119a and 119b from the terminal portions 114 and 115 side to the terminal portions 116 and 117 side, thereby selecting the second matching circuit 113 matching the electrical length of λ/2 in the extension state.

That is, in the present invention, the helical coil portion 104 or the linear element portion 108 is selected in accordance with the accommodation or extension state of the antenna 103, thereby switching the types of the antennas, i.e., the helical antenna and the whip antenna. At the same time, the impedance matching circuit 111 is automatically switched in accordance with the electrical length of the antenna.

FIG. 3 shows the main part of another feeder structure of the helical coil portion of the present invention. In this example, a coupling conductive rod 121 stands from the upper portion of the helical coil feeder portion 106 to project into the protection cover 105. The helical coil portion 104 is fitted on the coupling conductive rod 121, and the coupling conductive rod 121 and the helical coil portion 104 are capacitively coupled instead of being mechanically connected to each other. With this structure, the connection operation between the helical coil portion 104 and the coupling conductive rod 121, which is troublesome and requires a skill, becomes unnecessary.

In this example, the coupling conductive rod 121 stands from the helical coil feeder portion 106. However, the coupling conductive rod 121 may also be formed integrally with the helical coil feeder portion 106.

As has been described above, according to the present invention, a function of a whip antenna consisting of a linear element having an electrical length of λ/2 can be obtained in the antenna extension state, i.e., in the busy state. Since the current at the feeder position is minimized, the degradation in gain can be minimized accordingly. In the antenna accommodation state, i.e., in a call terminating wait state, a function of a compact helical antenna with an helical coil having an electrical length of λ/4 for achieving a high gain can be obtained. Switching between these antennas is automatically performed in a manner interlocked with the antenna accommodation and extension operations so that the operability is improved.

What is claimed is:

1. A portable radio apparatus comprising:
    an antenna consisting of a linear element portion constituting a whip antenna and a helical coil portion constituting a helical antenna fixed to a distal end of said linear element portion through an insulating portion, said helical coil portion having an electrical length of λ/4 (λ: wavelength), and said linear element portion having an electrical length of λ/2, said antenna being supported to be extendible from a housing;
    transmission/reception means connected to said helical coil portion in an antenna accommodation state and connected to said linear element portion in an antenna extension state;
    first matching means for performing impedance matching between said helical coil portion and said transmission/reception means;
    second matching means for performing impedance matching between said linear element portion and said transmission/reception means; and
    first switching means for connecting said helical coil portion to said first matching means in the antenna accommodation state and connecting said linear element portion to said second matching means in the antenna extension state.

2. An apparatus according to claim 1, wherein said first switching means comprises an actuator operated by said linear element portion reciprocally moving in accordance with accommodation and extension operations of said antenna, and contacts for selecting one of said first and second means in accordance with an operative state of said actuator.

3. An apparatus according to claim 1, further comprising second switching means for selectively connecting said transmission/reception means to said helical coil portion and said linear element portion in the antenna accommodation state and in the antenna extension state.

4. An apparatus according to claim 3, wherein said second switching means comprises a first feeder portion arranged between said helical coil portion and said insulating portion to supply power to said helical coil portion, a second feeder portion arranged at a lower end of said linear element portion to supply power to said linear element portion, and a single conductive member selectively brought into contact with said first and second feeder portions which are reciprocally moved in accordance with accommodation and extension operations of said antenna.

5. An apparatus according to claim 4, further comprising a conductive rod electrically connected to said first feeder portion and wounded by said helical coil portion, and wherein said helical coil portion is capacitively coupled to said conductive rod.

6. An apparatus according to claim 1, wherein said first switching means selectively performs connection of said first matching circuit between said transmission/reception means and said helical coil portion and connection of said second matching circuit between said transmission/reception means and said linear element portion.

7. A portable radio apparatus comprising:

an antenna consisting of a linear element portion constituting a whip antenna and a helical coil portion constituting a helical antenna fixed to a distal end of said linear element portion through an insulating portion, said helical coil portion having an electrical length of λ/4 (λ: wavelength), and said linear element portion having an electrical length of λ/2, said antenna being supported to be extendible from a housing;

transmission/reception means connected to said helical coil portion in an antenna accommodation state and connected to said linear element portion in an antenna extension state;

first matching means for performing impedance matching between said helical coil portion and said transmission/reception means;

second matching means for performing impedance matching between said linear element portion and said transmission/reception means;

first switching means for connecting said helical coil portion to said first matching means in the antenna accommodation state and connecting said linear element portion to said second matching means in the antenna extension state, said first switching means selectively performing connection of said first matching circuit between said transmission/reception means and said helical coil portion and connection of said second matching circuit between said transmission/reception means and said linear element portion; and second switching means for selectively connecting said transmission/reception means to said helical coil portion and said linear element portion in the antenna accommodation state and in the antenna extension state.

8. An apparatus according to claim 7, wherein said first switching means comprises an actuator operated by said linear element portion reciprocally moving in accordance with accommodation and extension operations of said antenna, and contacts for selecting one of said first and second means in accordance with an operative state of said actuator.

9. An apparatus according to claim 7, wherein said second switching means comprises a first feeder portion arranged between said helical coil portion and said insulating portion to supply power to said helical coil portion, a second feeder portion arranged at a lower end of said linear element portion to supply power to said linear element portion, and a single conductive member selectively brought into contact with said first and second feeder portions which are reciprocally moved in accordance with accommodation and extension operations of said antenna.

10. An apparatus according to claim 9, further comprising a conductive rod electrically connected to said first feeder portion and wounded by said helical coil portion, and wherein said helical coil portion is capacitively coupled to said conductive rod.

* * * * *